United States Patent [19]

Stout

[11] Patent Number: 5,477,665
[45] Date of Patent: Dec. 26, 1995

[54] SUPPORT STRUT ASSEMBLY FOR ROTATING FLEXIBLE LINE-TYPE VEGETATION TRIMMER

[76] Inventor: Lynda M. Stout, C/O Marle Pembrook, Rt. 2 Box 20, Cherokee, Okla. 73728

[21] Appl. No.: 294,151

[22] Filed: Aug. 22, 1994

[51] Int. Cl.$^6$ ............................... A01G 3/06; A01D 34/67
[52] U.S. Cl. .............................................. 56/16.7; 56/17.2
[58] Field of Search ................................... 56/12.1, 12.7, 56/16.7, 16.9, 17.2, 17.5, 400.14; 30/275.4, 296.1; 403/103, 104; 280/47.26, DIG. 6

[56] References Cited

U.S. PATENT DOCUMENTS

| | | | |
|---|---|---|---|
| 1,467,212 | 9/1923 | Walsh | 56/400.14 |
| 2,914,336 | 11/1959 | Hibben, Jr. et al. | 280/DIG. 6 |
| 3,726,537 | 4/1973 | McLoughlin | 280/DIG. 6 |
| 4,224,784 | 9/1980 | Hansen et al. | 56/16.9 |
| 4,829,755 | 5/1989 | Nance | 56/17.1 |
| 4,891,931 | 1/1990 | Holland | 56/16.7 |
| 5,095,687 | 3/1992 | Andrew et al. | 56/12.7 |
| 5,279,102 | 1/1994 | Foster | 56/17.2 X |
| 5,317,807 | 6/1994 | Pulley | 56/12.7 |

FOREIGN PATENT DOCUMENTS

| | | | |
|---|---|---|---|
| 1161069 | 1/1964 | Germany | 56/17.5 |
| 807207 | 1/1959 | United Kingdom | 56/16.7 |

Primary Examiner—David J. Bagnell
Attorney, Agent, or Firm—Robert K. Rhea

[57] ABSTRACT

This invention provides a strut apparatus for supporting the head portion of a weed and grass cutting trimmer in a generally horizontal mode. The trimmer includes an elongated tubular member providing a handle. The support apparatus principally comprises a two-part telescoping strut in which a compression spring interposed between the telescoping members substantially supports the mass of the trimmer when the depending end portion of the strut is in contact with the surface of the earth and the trimming head is positioned at a predetermined distance from the surface of the earth. The trimmer is controlled in its weed trimming function by a user grasping the handle.

4 Claims, 1 Drawing Sheet

U.S. Patent  Dec. 26, 1995  5,477,665
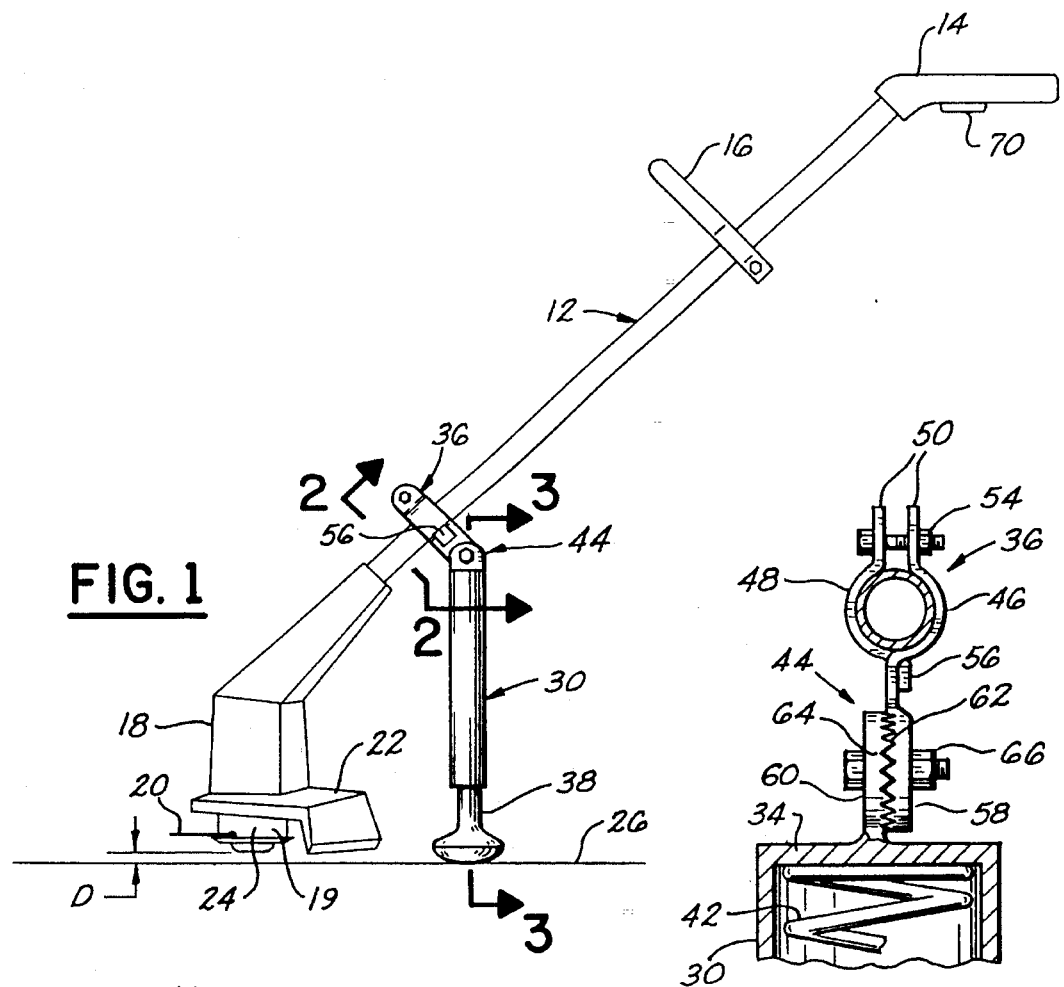
FIG. 1
FIG. 2
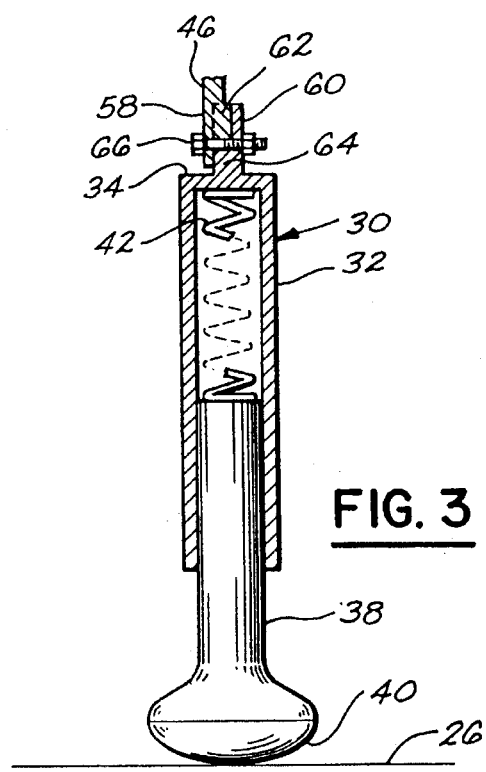
FIG. 3
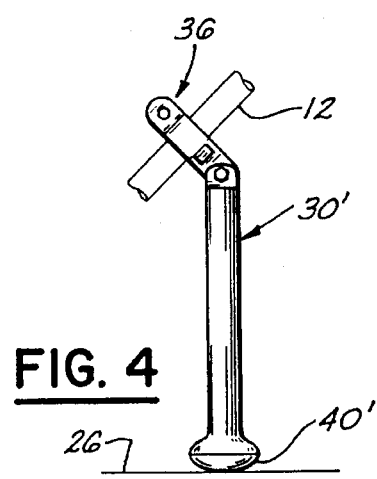
FIG. 4

SUPPORT STRUT ASSEMBLY FOR ROTATING FLEXIBLE LINE-TYPE VEGETATION TRIMMER

BACKGROUND OF THE INVENTION

1. Field of the Invention

This invention generally relates to trimmers used for cutting grass and weeds by a rotating cutting line and more particularly to a strut assembly supporting the major mass of a line trimmer.

Hand held power operated vegetation trimmers driving the free end portion of a monofilament line in an angular direction about the axis of a spindle forming a continuation of a motor drive shaft are in general use for cutting weeds, edging lawns and mowing in areas inaccessible to mowers.

One brand of such line trimmers is presently marketed under the trademark WEEDEATER and is generally referred to as a string trimmer or line trimmer. These line trimmers are generally used in the manner intended, namely while a line is rotated or whipping in a generally horizontal plane about a generally vertical axis.

In general, conventional line trimmers feature a downwardly facing rotary head having a radially projecting arcuate shield having a down turned flange at its radially outer edge. The head is mounted on the vertical drive shaft of a motor in a motor housing supporting the shield and connected with a generally tubular shaft projecting angularly upward from the motor housing and terminating in a handle end. In some trimmers a second handle is added to the handle intermediate its ends for aid in supporting the mass of the motor and components.

The main problem in operating such a vegetation trimmer is that the user must support the mass of the device in cantilever fashion forwardly of his body and swing it in arcs back and forth during the trimming action. Many user's suffer muscle strain from the mass of the device and its vibration.

In many trimmers the line is advanced as it wears by manually bumping a hub, forming a part of the spindle head, against the ground to extend the line.

Further, another problem in using the device results in the inability of the user to blend the height of the trimmed grass with the height of the lawn mower cut grass which is partially, at least, due to the difficulty involved in physically controlling the trimmer, particularly, when the user is of small stature.

This invention eleviates most of the above problems by forming a strut which supports the majority of the mass of a trimmer while in use.

2. Description of the Prior Art

U.S. Pat. No. 4,891,931 issued Jan. 9, 1990 to Holland for WEED CUTTER WHEEL KIT discloses a pair of axle mounted wheels depending from a bracket secured to the angularly upward handle shaft of a whirling line weed trimmer, which permits forward and rearward movement of the weed trimmer about the supporting wheels.

U.S. Pat. No. 5,095,687 issued Mar. 17, 1992 to Andrew et al for ADJUSTABLE SUPPORT WHEEL ASSEMBLY FOR ROTATING FLEXIBLE LINE-TYPE VEGETATION TRIMMER discloses a caster wheel mounted on the depending end of a vertical shaft secured at its upper end, by a clip and clamp, to the angular upward shaft handle for supporting the mass of a weed trimmer. The depending end portion of the caster shaft is stabilized by connection with the line trimmer shield at its radially rearward portion.

U.S. Pat. No. 4,224,784 issued Sep. 30, 1980 to Hansen et al for ATTACHMENT FOR LINE TRIMMER and U.S. Pat. No. 4,829,755 issued May 16, 1989 to Nance for TRIMMER WHEELS are believed good examples of the further state-of-the-art. The Hansen patent features a pair of wheels secured to an angularly upward extending shaft handle for side ways movement of the line trimmer to support the latter in a vertical mode so that it may be used as an edge trimmer. The Nance patent features a pair of wheels connected with the control shaft of a line trimmer at the rearward limit of its line trimmer guard for forward and rearward movement of the line trimmer in line trimmer mass supporting relation.

The invention is distinctive over all of the above named patents by providing a compression spring interposed between telescoping members forming a strut for supporting the mass of a line trimmer and is secured to the angularly upwardly directed operating handle by a clamp and serrated joint pivot connection on the clamp. The lowermost telescoping member is provided with a hemiellipsoidal surface for gliding over soil, lawn and grass during the vegetation trimming action.

SUMMARY OF THE INVENTION

A vertical line trimmer mass supporting strut having a clamp at its upper end is connected with an intermediate portion of a line trimmer handle shaft. The strut comprises a downwardly open socket pivotally secured at its upper end to the handle shaft clamp. A strut shaft is telescopically received by the downwardly open socket and a compression spring is interposed between the inner end of the socket and the upwardly disposed end of the strut shaft. The depending end of the strut shaft is characterized by an ellipsoidal end surface for movement with the weed trimmer in any direction over the surface of the earth in weed trimmer supporting relation.

The principal object of this invention is to support the a major portion of a weed trimmer mass while in use.

BRIEF DESCRIPTION OF THE DRAWINGS

FIG. 1 is a side elevational view of a weed trimmer having a support strut in operative position;

FIG. 2 is a fragmentary vertical cross sectional view, to a larger scale, taken substantially along the line 2—2 of FIG. 1;

FIG. 3 is a fragmentary vertical cross sectional view to another scale, taken substantially along the line 3—3 of FIG. 1; and, FIG. 4 is a fragmentary side elevational view of another embodiment of the strut.

The reference numeral 10 indicates a substantially conventional weed trimmer having an elongated control shaft 12 provided with handles 14 and 16 at one end portion and having a motor containing housing 18 at its other or head end portion.

The motor drives a spindle 19 containing and rotating a spool of monofilament line, not shown, with one end portion 20 of the line projecting beyond the spool, as is conventional. A radial and rearwardly projecting shield or safety guard 22 is interposed between the motor housing and the spindle 19. The spool is spring urged in the spindle and as the line 20 wears a depending spindle button 24 is forced inwardly by bumping the button 24 against the surface of the earth to extend the trimming line.

The above description is conventional with most weed trimmers of this type and is set forth to show the relationship of the trimmer support strut 30 with such a weed trimmer, as will now be explained.

The support strut 30 comprises a tube 32 having a closed end 34 pivotally connected with a clamp 36, as presently explained, transversely surrounding the downward end portion of the handle or control shaft 12 permitting pivotal adjustment of the strut 30 inline with the shaft 12. A strut shaft 38 is telescopically received by the open end portions of the tube 32.

The depending end portion of the strut shaft 38 substantially defines a hemiellipsoidal surface 40 contacting the surface of the earth 26, as presently explained.

An expansion spring 42 is interposed between the strut shaft 38 and the inner closed end 34 of the tube 32. Respective end portions of the spring is secured to the tube 32 and the strut shaft 38 to prevent telescopic separation of the tube from the strut shaft.

In actual practice, the expansion strength of the expansion spring 42 is chosen such that it will substantially support the mass of the trimmer 10 with its trimmer button 24 preferably spaced above the surface of the earth 26, a distance D (FIG. 1), and yet permit the compression spring 42 to be manually compressed sufficiently to telescopically force the strut 38 inwardly in the tube 32 and bump the button 24 against the surface of the earth 26 to extend additional trimming cord from the spool.

The tension of the expansion spring 42 repositions the telescoping members to support the trimmer button 24 spaced the selected distance D above the surface of the earth.

As best shown by FIG. 2, the clamp 36 integrally connected with one-half of a pivot joint 44, as presently explained, comprises a part circular clamp member 46 and a companion part circular clamp member 48 which cooperatively substantially surround an intermediate portion of the control shaft 12.

Each of the clamp members are provided with an ear portion 50 projecting laterally of the control shaft 12 in parallel spaced relation and are secured together in clamp fashion by a bolt and nut 54. The end portion of the clamp member 48, opposite its end 50, is transversely reduced from opposing sides, as at 56 (FIG. 1) to enter a cooperating slot formed in the clamp half section 46 for ease in applying and separating the clamp member 36 from the shaft 12.

The pivot connection 44 connecting the strut 30 to the clamp 36 comprises two cooperating substantially circular planar members 58 and 60 each being centrally apertured. The member 58 being integral with the clamp member 46 and the member 60 being integral with the closed end 34 of the tube 32.

Each of the members are provided with radially disposed cooperating interdigitated substantially V-shaped teeth 62 and 64, respectively, and are secured together by a bolt and nut 66.

FIG. 4 illustrates an alternative embodiment in which the strut 30' having a similar depending hemiellipsoidal surface 40' is formed from a single piece material.

Operation

In operation the line trimmer 10 is manually positioned substantially as illustrated by FIG. 1 and the clamp 36 is loosely positioned on the control shaft 12 so that the overall length of the strut 30, with its end surface 40 resting on the surface of the earth, positions the clamp 36 at a cooperating height intermediate the length of the shaft 12 when the strut is substantially vertically disposed.

The clamp bolt 54 is partially tightened so that the clamp supports the mass of the strut 30. The bolt 66 of the pivot joint 44 is loosened until the teeth 62 and 64 are separated so that the joint portion 60 may rotate relative to its companion 58 and gravity positions the strut 30 vertically below the clamp 36. The pivot joint bolt 66 is tightened to lock the teeth in interdigitated relation.

The bolt 54 of the clamp 36 is then securely tightened and the trimmer is ready for use by the user who grasps the handles 14 and 16 and energizes the motor in the housing 18 as by closing a control switch, indicated at 70.

The trimmer may then be moved forward, backward or from side to side wherein the hemiellipsoidal surface and resilience of the spring maintains the trimmer head in spaced relation with respect to the surface of the earth and supports substantially all of the mass of the trimmer.

As previously explained, when additional line 20 needs to be extended from the spindle the operator forces the trimmer head downwardly by manual force applied to the handle 16 which compresses the expansion spring 42 and momentarily bumps the trimmer button 24 against the surface of the earth 26 to extend the line end portion 20.

Obviously the invention is susceptible to changes or alterations without defeating its practicability. Therefore, I do not wish to be confined to the preferred embodiment shown in the drawings and described herein.

I claim:

1. A resilient support strut assembly for a vegetation line trimmer of the type having a length of monofilament line projecting radially from a spool contained by a motor driven spindle head angularly rotated in a generally horizontal plane about a generally vertical axis while manually supported, adjacent the surface of the earth, at the depending end of an upwardly inclined, with respect to the vertical, handle shaft, the improvement comprising:

clamp means transversely secured to a selected intermediate portion of said handle shaft;

elongated substantially vertical telescoping struts rigidly depending from said clamp means and having a friction reducing substantially hemisphercial earth contacting depending end surface for normally maintaining said spindle head in predetermined spaced relation with respect to the surface of the earth while the trimmer is in use;

pivoting joint means interposed between the uppermost said strut and said clamp means, said joint means comprising a pair of centrally apertured juxtaposed planar members respectively connected with the uppermost strut and said clamp means, the juxtaposed surfaces of each member of said pair of members having a continous circular array of radially disposed V-shaped teeth cooperating with the teeth in the opposite member;

bolt means axially securing said pair of members together in interdigitated locked relation; and, resilient means contained by one of said struts for limiting the telescoping movement of said strut members relative to each other.

2. The combination according to claim 1 in which said resilient means includes:

a helical compression spring.

3. The combination according to claim 1 in which said strut further includes:

an elongated tube having an upper closed end; and, a depending strut shaft telescopically received by said tube.

4. The combination according to claim 3 in which said resilient means includes:

a helical compression spring.

* * * * *